June 29, 1965     H. D. NUFFER ETAL     3,192,476
METHOD AND SYSTEM FOR OBTAINING DATA REGARDING
THE SURFACES OF CELESTIAL BODIES
Filed Nov. 2, 1962     2 Sheets-Sheet 1

INVENTORS.
HAROLD D. NUFFER
R. GORDON MC CARTY

ATTORNEY.

June 29, 1965 H. D. NUFFER ETAL 3,192,476
METHOD AND SYSTEM FOR OBTAINING DATA REGARDING
THE SURFACES OF CELESTIAL BODIES
Filed Nov. 2, 1962 2 Sheets-Sheet 2

INVENTORS.
HAROLD D. NUFFER
R. GORDON MC CARTY
BY
*P. H. Firsht*
ATTORNEY.

United States Patent Office 3,192,476
Patented June 29, 1965

3,192,476
METHOD AND SYSTEM FOR OBTAINING DATA REGARDING THE SURFACES OF CELESTIAL BODIES
Harold D. Nuffer, China Lake, and Richard G. McCarty, Santa Barbara, Calif., assignors to the United States of America as represented by the Secretary of the Navy
Filed Nov. 2, 1962, Ser. No. 235,165
6 Claims. (Cl. 325—15)
(Granted under Title 35, U.S. Code (1952), sec. 266)

The invention herein described may be manufactured and used by or for the Government of the United States of America for governmental purposes without the payment of any royalties thereon or therefor.

The present invention relates to a telemetering system and more particularly to a system for observing the surface of body in space and telemetering the information to a remote receiver.

The systems utilized in the field of space probing for recording and telemetering information obtained through the use of camera type devices mounted in space vehicles may either orbit, "fly-by," or assume an arcuate path with respect to the earth or other celestrial body. Such systems often involve the use of tape recording systems which function to first record information on a recording tape, then rewind the tape for play-back, and subsequently, at a given signal, "dump" the information by feeding the rewound tape through a play-back system which retrieves the information and relays it through a transmitter to a remote receiver. These devices or systems have not been entirely satisfactory as they require extensive power supply systems for first recording a high frequency or broad bandwidth, and then playing back and transmitting the recording bandwidth. Further, the recording and play-back operations of the prior art require two separate and distinct operations which occur at different intervals of time. Therefore, valuable information is frequently lost as unrecorded, since the two operations are not simultaneously performed. Other undesirable features and disadvantages encountered in the use of the prior art systems include excessive bulk, weight and general fragility intrinsic in these systems.

Therefore, the purpose of this invention is to provide a light weight device capable of recording information at a given rate and transmitting the information at a lower rate in a manner which provides for periodically obtaining and recording information as a consequence of scanning a body in space, while continuously transmitting the information to a remote receiver.

An object of this invention is to provide in a space probing system a device which receives information and records a given relatively high frequency, or broad bandwidth, while continuously transmitting a reduced frequency or narrow bandwidth for reducing the power necessary for transmission, and allowing the device to function in an uninterrupted manner.

Another object is to provide a method and device for expanding the recording time base during the transmittal of recorded information.

Yet another object is to provide a lightweight device capable of being operated in a continuous manner within a space observation vehicle for use in observing the surface of a celestial body and telemetering the observation in a continuous manner.

A further object is to provide a tape recorder, play-back and transmitter system wherein a high frequency recording is carried out on an endless tape, during intervals of relatively short duration, while simultaneously play-back is being performed in a continuous and uninterrupted manner for producing a continuous low frequency transmitter input signal to thus expand the recording time base.

Other objects, advantages and novel features of the invention will become apparent from the following detailed description of the invention when considered in conjunction with the accompanying drawings wherein.

Figure 1:
FIG. 1 is a schematic view illustrating the relative position of various components of the present invention when disposed in operative position.

Referring now more specifically to the drawings, wherein like reference numerals represent like or corresponding parts through the several views, there is shown in FIG. 1 a space vehicle 10, illustrated as having a spherical configuration but which may be of any shape found desirable, revolving about its own generally vertical axis and being displaced relative to the surface of a light-reflecting celestial body M located in space, and being displaced with respect to a remote receiving antenna E, which may be located at suitable locations on earth. The specific path along which the vehicle 10 is displaced is not critical and may assume the configuration of an orbit, a straight-line, or an arc with respect to the surface of the body being observed. Therefore, the relative path of the vehicle, the relative disposition of the receiving antenna and surface to be observed may be varied in any manner found desirable so long as the rotation of the vehicle 10 about its axis is in such a manner as to permit an observation of the surface of the body M.

Disposed within the vehicle 10 and directed therefrom through a window 10' fixed therewithin, there is a scanning means or device 11, which may comprise a "telescope," a "television" camera, or other known means for continuously generating desired signals. An "eye" 12, or light-responsive control means which may take the form of a photosensitive device, is directed through the window 10' for viewing the regional areas scanned by the scanning means 11 whereby, when the body M appears before the window 10' the eye will be activated by light caused by the presence of the body M and information will be obtained and a recording thereof, initiated and controlled by the activation of the eye 12 acting through a relay 12' for completing a circuit between the system's power output or supply 13 to a recording tape drive means located at a recording station 14'. The recording initiated at station 14' continues under the dictates of the eye 12 acting through the relay 12' for the period during which the body M is so positioned with respect to the window 10' as to present an area to be scanned and cause reflected light to activate the eye 12. This permits signals generated by the scanning device 11 to be relayed to the recording station 14' and recorded in a series of intermittently occurring intervals, or short bursts, as the vehicle 10 rotates on its axis in the manner indicated in FIG. 1.

The system's power output or supply 13 may be in the form of batteries arranged in a pack, or solar cells connected through a suitable circuit of conventional design to desired components of the system as is necessary for performing the desired functions. The information obtained by and fed from the scanning device 11 to the recording station 14' is transmitted by transmitter 15 through an antenna 16 to a receiving antenna E. The transmitter 15 may be of known and suitable design which, due to the low power consumption of the device, may include a transistorized transmitter system.

Figure 4:
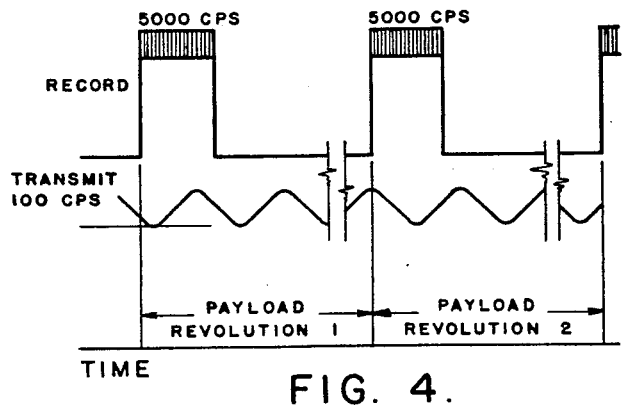
FIG. 4 is a diagrammatic view illustrating a comparison of the recording frequency with the transmitting frequency, as provided in the time base expansion of the present invention.
Figure 2:
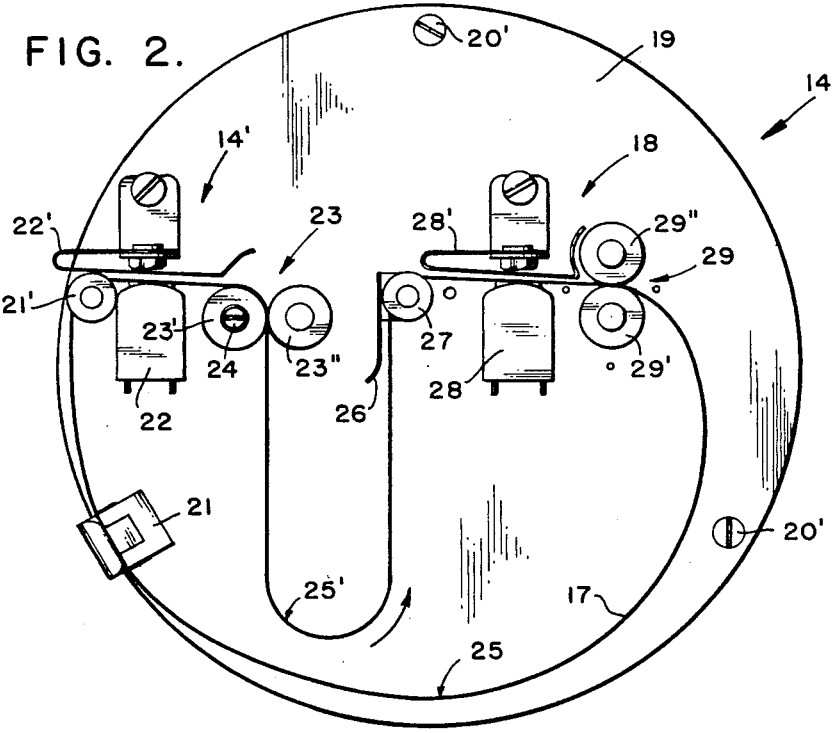
FIG. 2 is a plan view, on an enlarged scale, of the recorder and play-back device of the present invention.

In order that the information obtained through the scanning device 11 may be telemetered to a given receiving antenna E, an endless tape 17, FIG. 2, is provided at the recording station 14' so that the information obtained by the device 11 is recorded thereon at a given high frequency. The recorded information is then to be taken from the tape, which is continuously advanced through the retrieval station 18, and fed at a lower frequency to the transmitter 15 and antenna 16. A comparison of the two frequencies hereinabove referred to is schematically illustrated in FIG. 4.

Figure 3:
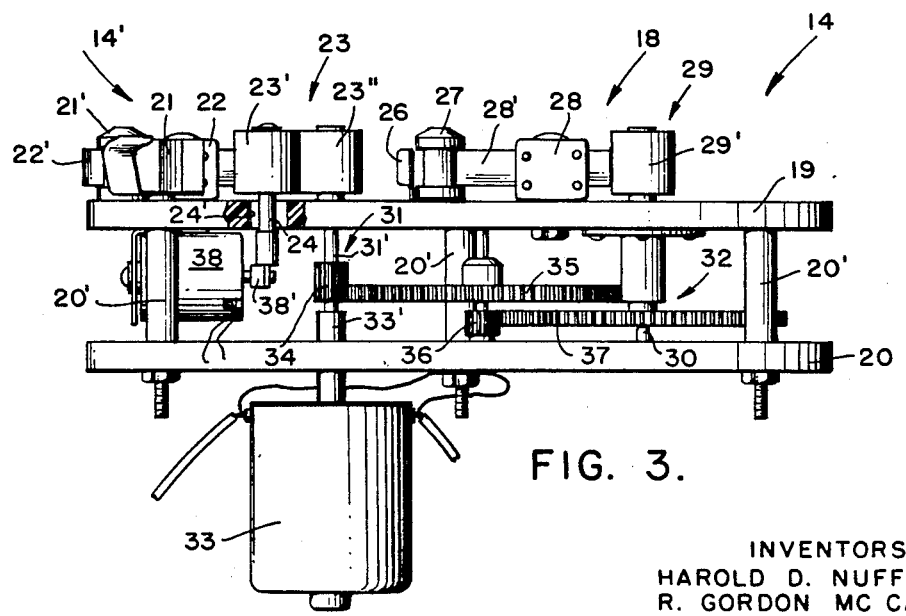
FIG. 3 is an elevational view of the device of FIG. 2 with the endless tape omitted.

The recording station 14' and the retrieval station 18 are arranged on the surface of a supporting deck 19, formed of any suitable material, which is disposed above a plate 20 and mounted in fixed relationship therewith by means of studs 20', FIG. 3. An obliterating device 21 serves to erase any information thereon, prior to the tape being directed to recording station 14' by a rotary guide 21'. At the station 14' the tape engages a recording head 22 where it is maintained in an operative recording contact therewith by an appropriate biasing shoe 22'. For advancing the tape 17 at the station 14', a tape feeding couple, generally designated 23, FIG. 2, is disposed adjacent the recording head 22 and comprises an idler 23' and a continuously driven capstan 23" having a friction surface. The couple 23 is so arranged as to be intermittently activated for drawing the tape through the recording station 14' for recording the information thereon. In order that the feeding couple may be intermittently activated, the idler 23' is mounted on a shaft 24 which extends through an enlarged opening 24' in the deck 19, FIG. 3, so that the shaft 24, and consequently the idler 23', may be laterally displaced selectively, by means hereinafter more fully described. As the idler 23' is displaced it engages the tape 17 and brings it into frictional tape-feed engagement with the surface of the continuously operable capstan 23", whereby the tape 17 may be advanced thereby.

As illustrated in FIG. 2, the tape 17 comprises a continuous member extending through both the recording and the retrieval stations 14' and 18, respectively. Since the tape 17 is periodically advanced through station 14' by the intermittently activated couple 23, it is necessary that the tape be of such a length as to obviate undue tension. This may be attained through the provision of a tensionless outer loop, generally designated 25, from which the tape is drawn into station 14', and an inner loop located between the stations, generally designated 25', to which the tape is fed from station 14'. The size of each of these loops is caused to vary through the intermittent operation of the couple 23, since, the endless tape 17 is advanced through the station 18 in the hereinbefore mentioned continuous fashion. For continuously advancing and guiding the tape through the retrieval station 18 there is arranged a flexible leaf spring tape guide 26 and a rotary idler 27, for directing the information bearing tape to a play-back head 28 which retrieves the recorded information so that it may be fed to the system transmitter 15. An appropriate spring biased shoe 28' is so positioned adjacent the information play-back head 28 as to form a channel through which the tape is drawn in the aforesaid continuous manner by a continuously operable feeding couple generally designated by the reference numeral 29, FIG. 2. The feeding couple 29 comprises a freely rotatable idler 29' disposed opposite a continuously driven friction surfaced capstan 29", whereby the tape is engaged by the couple 29 and drawn from the loop 25 through the retrieval station 18 past the head 28. Thus the information supplied by the scanning device 11 is intermittently recorded on tape 17 at the recording station 14' and continuously retrieved at the play-back head 28 and fed to the transmitter 15 from the retrieval station 18 in a continuous manner. As the specific scanning means, eye, recording head, play-back head, and transmitter are of a known design, no detailed description of these devices is here deemed necessary for providing an understanding of the claimed invention, as the components for the system may be selected according to current operational requirements.

Figure 5:
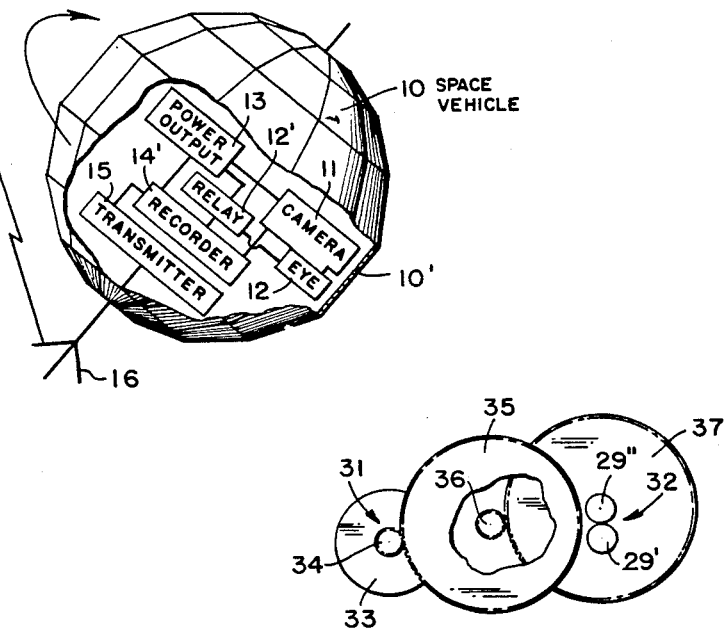
FIG. 5 is a schematic view, on a reduced scale, illustrating the power trains for the recording and play-back stations of the present invention.

The driven capstans 23" and 29" are operated through a pair of power trains 31 and 32 by a motor 33. These trains are so designed as to provide a fixed ratio between their respective outputs for achieving a fixed predetermined ratio between the surface speeds of the driven capstans. As may be seen in FIG. 3, the capstans 23" is driven directly through a shaft 31' of the train 31 by the motor 33, and is operatively coupled thereto through a coupling means 33', therefore, causing the capstan 23" to be driven at the speed of the motor 33. The drive shaft 30 of capstan 29", disposed at the retrieval station 18, is driven from the motor 33 at a substantially reduced speed as the train 32 is provided with a series of reduction gears 34, 35, 36, and 37, as illustrated in FIG. 5. The trains 31 and 32 function to establish output speeds for the driven capstans 23" and 27" which bear the same relationship to each other as the period of time of camera "scan" bears to the period of time necessary to complete a single rotation of the payload about its axis.

As previously described, the window 10' will face the body M during only a brief portion of each revolution of the vehicle 10. Hence, it is necessary that the entire recording for each revolution occur during only a portion of that revolution. This requires a recording of a high frequency or broad bandwidth and a rapid feeding of the tape 17 past the recording head 22. Since no scanning occurs during the remaining and substantial portion of the revolution of the vehicle, it is not necessary that the tape may be fed past the recording head 22 during this period, therefore, the tape may be fed past the recording head 22 rapidly, but only for a brief period for each revolution of the vehicle to receive a recording of a broad bandwidth thereon. Recording in this manner provides a series of high frequency recordings adjacently disposed on the tape as the vehicle continues to rotate.

The tape 17 is fed past the play-back head 28 at a rate which allows the information recorded during a single scanning portion of the revolution to be transmitted during a period of time necessary for the vehicle to rotate through a substantially complete revolution. Hence, the tape 17 is fed past the play-back head at a constant and substantially reduced rate thus allowing the recorded frequency to be retrieved during a longer period of time to thereby expand the recording time base and provide signals having a lower than recording frequency for transmission purposes. For example, it has been found that the device may operate satisfactorily with a 50 to 1 ratio between the speeds of the recording and play-back capstans, thus necessitating a feeding of the tape at speeds of 62.9 i.p.s. (inches per second) and 1.255 i.p.s., respectively, for allowing the recording to occur during 1/50 of a rotation of vehicle and a play-back for transmission purposes to occur throughout a single rotation thereof.

In order for the capsan 23" to effect a feeding of the tape 17 for a desired portion of the revolution, there is provided a solenoid 38, FIG. 3, which is electrically connected through relay 12' to the power source 13, FIG. 1, for displacing the idler 23' through a coupling 38' and an idler shaft 24 into and out of tape feeding engagement with capstan 23". The displacement is initiated by the eye 12 acting through the relay 12' for completing the circuit between the power source 13 and the solenoid 38.

It is understood that while a photosensitive "eye" 12 has been disclosed as controlling the solenoid 38 through a relay 12', it is feasible to provide other control means for synchronizing and controlling the tape feeding operation. Further, it is understood that the endless tape 17 may be sufficiently long so as to provide for reasonable deviations from the contemplated ratios, of the actual "time of scan" to "time of no-scan," created by the vehicle moving closer or further from the body surface of M. In addition to a suitable length of tape, when a large variation in positions is contemplated, it is also feasible to utilize a timing means or other control device with the relay so that the solenoid 38 may be activated for only a given period of time regardless of signals being generated by the eye 12. Also, it is appreciated that where contemplated ratio variations make it desirable, a compensating means may be provided to continuously vary the ratio between the speeds of the capstans in accordance with the variations in the scanning times created during the displacement of the vehicle along its path relative to the surface of the body. As these variously contemplated and suggested arrangements form no part of the claimed invention, a specific description thereof is not deemed necessary for an understanding of the system of the present invention.

In operation, it is assumed that the system of the present invention is being employed to scan the surface of a body M, which is reflecting light, and that the vehicle 10 is passing the body M at a predetermined distance and is simultaneously revolving about its own generally vertical axis at a predetermined rate so as to present its window 10' to the body M during a portion of each of its revolutions. As body M comes into view before window 10', the photosensitive eye 12 is activated through light reflection caused by the presence of the body M. The eye 12 in turn serves to initiate closing of a circuit, through relay 12', between the power supply 13 and the solenoid 38 for actuating the feeding couple 23 located at the recording station 14'. Upon the closing of this circuit under the dictates of eye 12, information regarding the body M, which is being supplied through the scanning device 11 to the recording head 22, is recorded on the endless tape 17 at a given predetermined rate, for example, 50,000 cycles per second. The tape is fed by the feeding couple 23 past the recording head 22 into the variable sized loop 25 at a predetermined rate for receiving the information at the given frequency, for example, the rate of tape feed may be 62.9 i.p.s. As the window 10' rotates away from body M, the eye 12 is inactivated through the absence of light reflecting from the body and accordingly the circuit is opened between the power supply 13 and the solenoid 38 thus halting the tape feeding operation. It is here noted that no intelligence signals are being supplied to the head 22, since the body M is no longer before the window 10', hence, the head 22 does not serve to record intelligence signals on the tape 17. Therefore, the tape may remain stationary at the recording station 14' when the scanning device does not "see" the body M. Simultaneoulsy with the recording of information, or the recording of the intelligence signals being recorded in short bursts on the tape, a retrieving and transmitting operation is being carried out in a continuous manner at the retrieving station 18. The tape 17 is continuously fed by the couple 29 from the loop 25 at a predetermined rate, for example, 1.255 i.p.s., or 1/50 of the recording speed, whereby the recorded signals are retrieved from the tape and fed to the transmitter 15 at 1/50 the recording frequency to thus expand by a factor of 50 the time base at which the recording occurred.

Therefore, it is understood that information regarding the surface of body M is obtained during a brief scanning period occurring in each revolution of the vehicle and is intermittently recorded at a given frequency while being continuously retrieved at a reduced rate and transmitted at a substantially reduced frequency to thereby effect an expansion of the recording time base at the retrieval and transmission thereof to thus provide a lower transmitting frequency. The information thus transmitted is reduced as desired at the receiving antenna E.

In view of the foregoing, it is to be understood that through the instant invention there has been provided a method and device for continuously gathering information concerning the surface of a celestial or other body distantly located from the device as it travels along a predetermined course with respect to that body. Occurring simultaneously with the information gathering operation there is a continuous transmission of gathered information to a remotely located receiver system. This simultaneous characteristic is made possible by providing a continuous tape which receives gathered information at a recording station and supplies it to a transmitter through a play-back head. As it is known that the power required to transmit a signal is directly proportional to the information rate, the tape may be briefly but rapidly fed at the recording station so that a high frequency may be recorded in short bursts and continuously played back on an expanded time base as the tape is continuously fed at a lower rate past the play-back head, to thereby attain a substantial saving in the power consumed by the system. This saving in power consumption permits a maximum utilization of transistor circuits with the attendant advantages being realized.

Obviously many modifications and variations of the present invention are possible in the light of the above teachings. It is therefore to be understood that within the scope of the appended claims the invention may be practiced otherwise than as specifically described.

What is claimed is:

1. In a telemetering system for scanning the surface of a light-reflecting body disposed in space and relaying the information thus obtained to a remotely disposed receiver, the combination comprising:

a hollow payload revolving about its own axis and having a scanning window therein for intermittently facing the body during each revolution of the payload;

an operative power supply for the payload;

an operable, light-responsive signal producing scanning means disposed adjacent said window;

a payload signal transmitter;

an endless recording tape;

an information recording station for receiving a portion of said tape;

a recording means connected with said scanning means and located at said recording station including a tape feeding means for intermittently feeding and recording on said tape at a given first rate the signals produced by said scanning means;

an information retrieval station displaced from recording station;

play-back means including a tape feeding means operable at a continuous and substantially reduced second rate for continuously retrieving the intermittently recorded information from the tape and feeding it to said transmitter for continuous transmission;

a tape feeding control system including a reflected light responsive device disposed adjacent said window and connected with a relay circuit arranged between the power-supply and the tape feeding means adapted to be energized in response to light reflected from the body for closing said relay between the tape feeding means and the power-supply for thus intermittently initiating and maintaining an operation of the tape feeding means for that portion of each revolution of the payload during which said window faces said body; and continuously operable means including a continuously operable tape advancing means arranged at the retrieving station for controlling the rate of retrieval of the information so that the information recorded during said portion of each revolution of the payload may be transmitted continuously at a reduced rate substantially throughout a single revolution of the payload.

2. The system according to claim 1, further characterized in that a single motor is provided to drive the tape feeding means at both the recording and at the retrieval station.

3. The system according to claim 2 wherein each tape feeding means comprises a tape feeding couple, and the means for controlling the rate of retrieval and transmission of the recorded information comprises a gear train disposed between the couples, whereby the rate of feed of the tape feeding couple at the information retrieval station is a rate relatively fixed with respect to the rate of feed of the tape feeding couple at the recording station.

4. The system according to claim 3 further characterized in that the control means further includes an operable solenoid provided for dictating the duration of the tape feeding period at the recording station.

5. In a telemetering system for scanning the surface of a celestial body from a space vehicle of the type including a system power source, an operable body scanning and signal generating means for scanning a body and generating intelligence signals in response thereto, a signal transmitting means for transmitting said signals, a signal recording means for recording signals generated by said scanning means, and means for retrieving the recorded signals and feeding them to said transmitter, the improvement comprising:

a recording head for recording generated signals at a first frequency;
  an endless recording tape disposed to extend through said head and co-operating therewith for receiving and recording the generated signals;
  a first and a second tape driving couple, each being provided with a driven capstan and an idler having driving surfaces so disposed as to receive therebetween a portion of said tape;
  a continuously activated couple-drive motor;
  a pair of gear trains having a fixed gear ratio established therebetween for connecting said couples with said motor, whereby the driving surfaces of the capstan of the first couple may be caused to be driven at first speed, while the driving surfaces of the second capstan may be caused to be driven at a predetermined slower speed;
  an operative solenoid for alternately moving the idler of said first couple into tape feeding engagement with the driven capstan of said first couple at the initiation of a recording interval for displacing said tape at a first given rate through said recording head, and for moving the idler out of feeding engagement at the termination of the recording interval to thus cause said tape to cease displacement through said recording head;
  a solenoid control system connected with said solenoid adapted to initiate an operation of said solenoid in response to a preselected positioning of the scanning means relative to a body being scanned;
  a transmitter pickup head disposed adjacent said second couple adapted to retrieve recorded signals from said tape and feed the signals to said transmitter at a second frequency lower than said first frequency; and
  means for maintaining the idler and capstan of the second couple in continuous tape feeding engagement for continuously displacing the tape past the pickup head.

6. A method of providing data regarding relatively large surfaces of given celestial bodies from which light is reflected, comprising the steps of:

progressively displacing a payload with respect to a given surface which is to be observed for obtaining data therefrom;
  revolving said payload in successive revolutions about its own axis, as it is displaced relative to said surface, in a manner such that light reflected from said surface is caused to be received within a given area of said payload for a limited scanning portion of each successive revolution of the payload;
  detecting the reflected light received within said area and scanning said surface during each scanning portion in response to the light for thus obtaining surface data intelligence;
  recording on an endless tape, and at a first frequency, surface data intelligence as it is obtained through the scanning of said surface;
  continuously retrieving the recorded intelligence throughout a complete revolution of said payload; and
  continuously transmitting at a lower frequency the retrieved intelligence concurrently with the retrieval thereof, whereby surface data intelligence obtained through the scanning of the surface is recorded at a first frequency during a portion of each single revolution of the payload and is transmitted at a lower frequency throughout a complete single revolution of said payload.

References Cited by the Examiner

UNITED STATES PATENTS

| 1,677,296 | 7/28 | Rosenbaum | 325—6 |
| 2,875,436 | 2/59 | Hammond | 325—6 |
| 3,063,048 | 11/62 | Lehan et al. | 325—15 |

FOREIGN PATENTS 685,032  12/52  Great Britain.

OTHER REFERENCES

McQuay: Electronics World, August 1959, pp. 35, 36, 38, 124 and 125.

Electronic Age, vol. 19, No. 2, Spring 1960, pp. 2–7.

DAVID G. REDINBAUGH, *Primary Examiner.*